(12) United States Patent
Engelhardt et al.

(10) Patent No.: US 6,813,073 B2
(45) Date of Patent: Nov. 2, 2004

(54) LIGHT SOURCE FOR ILLUMINATION IN SCANNING MICROSCOPY, AND SCANNING MICROSCOPE

(75) Inventors: Johann Engelhardt, Bad Schoenborn (DE); Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 310 days.

(21) Appl. No.: 09/985,015

(22) Filed: Nov. 1, 2001

(65) Prior Publication Data
US 2002/0063220 A1 May 30, 2002

(30) Foreign Application Priority Data
Nov. 14, 2000 (DE) .......................................... 100 56 382

(51) Int. Cl.⁷ .......................... G02B 21/06; G02B 21/00
(52) U.S. Cl. ........................ 359/388; 359/385; 359/368
(58) Field of Search .................................. 359/368–390, 359/634–639; 356/346–349, 381, 497; 250/458.1, 459.1

(56) References Cited

U.S. PATENT DOCUMENTS

| | | | |
|---|---|---|---|
| 4,907,886 A | | 3/1990 | Dandliker .................... 356/487 |
| 5,345,306 A | * | 9/1994 | Ichimura et al. ............ 356/451 |
| 5,486,919 A | * | 1/1996 | Tsuji et al. .................. 356/484 |
| 5,671,241 A | | 9/1997 | Stamm et al. ................ 372/20 |
| 5,731,588 A | | 3/1998 | Hell et al. ................ 250/458.1 |
| 5,835,262 A | * | 11/1998 | Iketaki et al. ............... 359/352 |
| 5,959,735 A | * | 9/1999 | Maris et al. ................ 356/632 |
| 6,496,267 B1 | * | 12/2002 | Takaoka ..................... 356/497 |
| 6,633,432 B2 | * | 10/2003 | Iketaki ....................... 359/386 |

FOREIGN PATENT DOCUMENTS

| | | |
|---|---|---|
| CH | 678 108 A5 | 7/1991 |
| DE | 44 07 664 A1 | 9/1994 |
| DE | 44 16 558 C2 | 8/1995 |
| DE | 195 17 753 A1 | 11/1996 |

* cited by examiner

Primary Examiner—Thong Q Nguyen
(74) Attorney, Agent, or Firm—Foley & Lardner LLP

(57) ABSTRACT

A light source for illumination in scanning microscopy, and a scanning microscope contain an electromagnetic energy source that emits light of one wavelength, and a beam splitter for spatially dividing the light into at least two partial light beams. An intermediate element for wavelength modification is provided in at least one partial light beam.

22 Claims, 4 Drawing Sheets

LIGHT SOURCE FOR ILLUMINATION IN SCANNING MICROSCOPY, AND SCANNING MICROSCOPE

CROSS REFERENCE TO RELATED APPLICATIONS

This invention claims priority of the German patent application 100 56 382.1 which is incorporated by reference herein.

FIELD OF THE INVENTION

The invention concerns a light source for illumination in scanning microscopy.

The invention further concerns a scanning microscope. The scanning microscope can also be configured as a confocal microscope.

BACKGROUND OF THE INVENTION

In scanning microscopy, a sample is illuminated with a light beam in order to observe the reflected or fluorescent light emitted from the sample. The focus of the illuminating light beam is moved in a specimen plane with the aid of a controllable beam deflection device, generally by tilting two mirrors; the deflection axes are usually at right angles to one another, so that one mirror deflects in the X and the other in the Y direction. The tilting of the mirrors is brought about, for example, using galvanometer positioning elements. The power level of the light coming from the specimen is measured as a function of the position of the scanning beam. The positioning elements are usually equipped with sensors for ascertaining the present mirror position.

In confocal scanning microscopy specifically, a specimen is scanned in three dimensions with the focus of a light beam.

A confocal scanning microscope generally comprises a light source, a focusing optical system with which the light of the source is focused onto a pinhole (called the excitation stop), a beam splitter, a beam deflection device for beam control, a microscope optical system, a detection stop, and the detectors for detecting the detected or fluorescent light. The illuminating light is coupled in via a beam splitter. The fluorescent or reflected light coming from the specimen arrives via the beam deflection device back at the beam splitter, passes through it, and is then focused onto the detection stop behind which the detectors are located. Detected light that does not derive directly from the focus region takes a different light path and does not pass through the detection stop, so that a point datum is obtained which, by sequential scanning of the specimen, results in a three-dimensional image. Usually a three-dimensional image is obtained by image acquisition in layers.

The power level of the light coming from the specimen is measured at fixed time intervals during the scanning operation, and thus scanned one grid point at a time. The measured value must be unequivocally associated with the pertinent scan position so that an image can be generated from the measured data. Preferably, for this purpose the status data of the adjusting elements of the beam deflection device are also continuously measured, or (although this is less accurate) the setpoint control data of the beam deflection device are used.

In a transmitted-light arrangement it is also possible, for example, to detect the fluorescent light, or the transmission of the exciting light, on the condenser side. The detected light beam does not then pass via the scanning mirror to the detector (non-descan configuration). For detection of the fluorescent light in the transmitted-light arrangement, a condenser-side detection stop would be necessary in order to achieve three-dimensional resolution as in the case of the descan configuration described. In the case of two-photon excitation, however, a condenser-side detection stop can be omitted, since the excitation probability depends on the square of the photon density (i.e., excitation probability is proportional to intensity$^2$), which of course is much greater at the focus than in neighboring regions. The fluorescent light to be detected therefore derives, with high probability, almost exclusively from the focus region; this makes superfluous any further differentiation between fluorescent photons from the focus region and fluorescent photons from the neighboring regions using a stop arrangement.

The resolution capability of a confocal scanning microscope is determined, among other factors, by the intensity distribution and spatial extension of the focus of the illuminating light beam. An arrangement for increasing the resolution capability for fluorescence applications is known from PCT/DE/95/00124. In this, the lateral edge regions of the illumination focus volume are illuminated with light of a different wavelength that is emitted by a second laser, so that the specimen regions excited there by the light of the first laser are brought back to the ground state in stimulated fashion. Only the light spontaneously emitted from the regions not illuminated by the second laser is then detected, the overall result being an improvement in resolution. This method has become known as STED (stimulated emission depletion).

Two lasers are usually used in STED microscopy, i.e. one to excite a specimen region and another to generate the stimulated emission. In particular for generating the stimulated emission, high light outputs and at the same time a maximally flexible wavelength selection are needed. Optical parametric oscillators (OPOs) are often used for this purpose. OPOs are very expensive, and moreover require high-powered pumping lasers. These are usually mode-coupled pulsed lasers, which are also very expensive. Costs for the exciting light source must also be added. All the lasers must furthermore be exactly aligned so as to arrive exactly at the individual specimen regions. In the case of pulsed excitation, it is important for the light pulses generating the stimulated emission to arrive within a specific time frame—which depends on the lifetime of the excited states of the specimen material—after the exciting light pulses. Synchronizing the pulsed lasers with one another is complex, and the result is often unsatisfactory and unstable.

SUMMARY OF THE INVENTION

It is the object of the invention to create a light source for illumination in scanning microscopy which is easy to handle, reliable, flexible and allows for STED microscopy in a less expensive way.

This object is achieved by a light source for illumination in scanning microscopy comprising:
  an electromagnetic energy source that emits light of one wavelength,
  a means for spatially dividing the light into at least two partial light beams, which is placed after the electromagnetic energy source; and
  an intermediate element for wavelength modification in at least one partial light beam.

A further object of the invention is to create an a scanning microscope which provides a flexible, reliable and easy to handle illumination and which allows for STED microscopy in a less expensive way.

The further object is achieved by a scanning microscope comprising:

- an electromagnetic energy source that emits light of one wavelength,
- a means for spatially dividing the light into at least two partial light beams, which is placed after the electromagnetic energy source,
- an intermediate element for wavelength modification in at least one partial light beam,
- a beam deflection device for guiding the two partial light beams over a specimen and
- a microscope optical system for focusing the partial light beams.

The use of the light source according to the present invention makes the illumination system for microscopy, and in particular STED microscopy, much simpler and much less expensive, since only one electromagnetic energy source is required.

In a particular embodiment, one partial light beam serves for optical excitation of a first region of a specimen. A further partial light beam, whose wavelength is modified with the aid of an intermediate element, is used to generate the stimulated emission in a further region of the specimen. The first region and the further region overlap at least partially. The wavelength of the second partial light beam is modified with an intermediate element. This intermediate element is preferably an optical parametric oscillator (OPO).

The invention has the further advantage that in the case of pulsed excitation, for example for purposes of multi-photon excitation, it is possible to dispense with synchronization among the pulsed light sources if the electromagnetic energy source that causes both the excitation and the stimulated emission is a pulsed laser.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
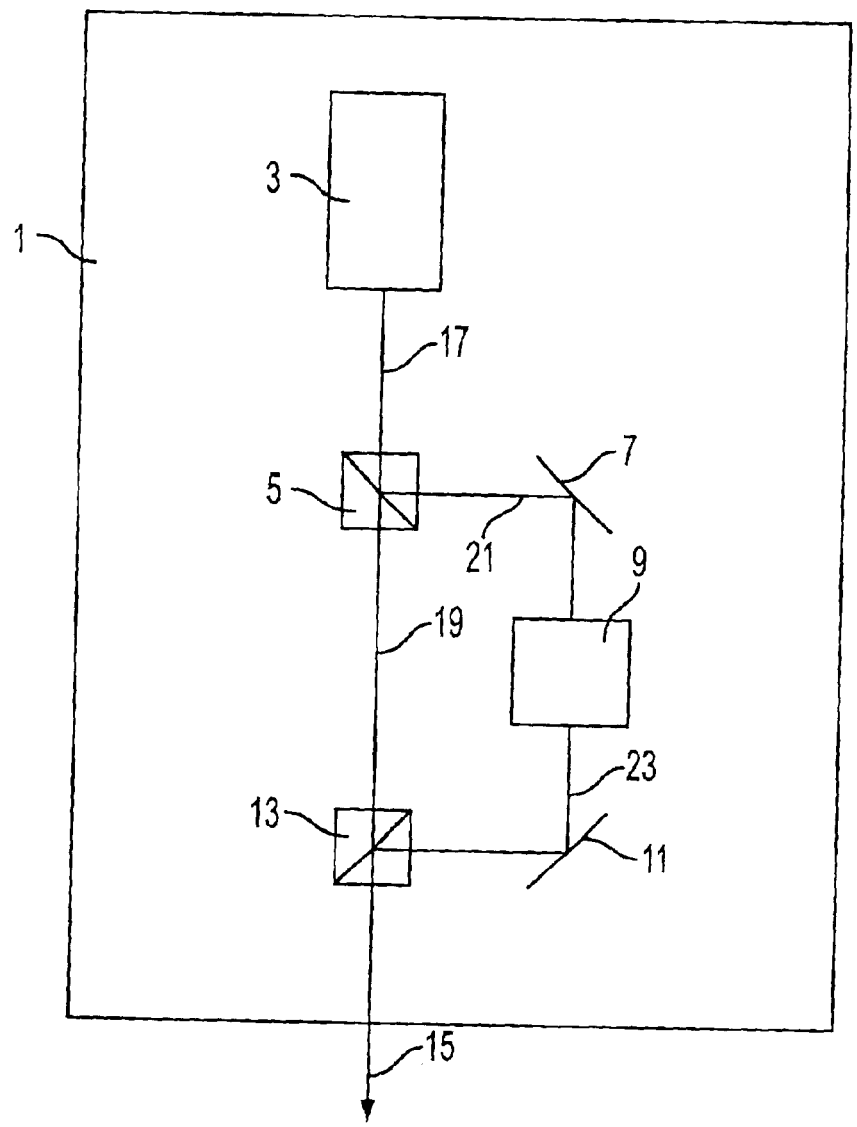
FIG. 1 shows a light source according to the present invention.

FIG. 1 shows a light source 1 according to the present invention. A pulsed laser that is embodied as a titanium:sapphire laser is provided as electromagnetic energy source 3. Light 17 of the pulsed laser is split into a first and second partial light beam 19 and 21 with the means for spatial division of the light, which is embodied as beam splitter 5. Partial light beam 21 passes via mirror 7 to intermediate element 9, which is embodied as an optical parametric oscillator. Partial light beam 23 emerging from optical parametric oscillator 9 is guided via mirror 11 to dichroic beam combiner 13 and combined there with first partial light beam 19 to form illuminating light 15 that emerges from light source 1. Mirrors 7 and 11 are mounted tiltably so that the relative positions of the components of the illuminating light can adjusted to one another.

Figure 2:
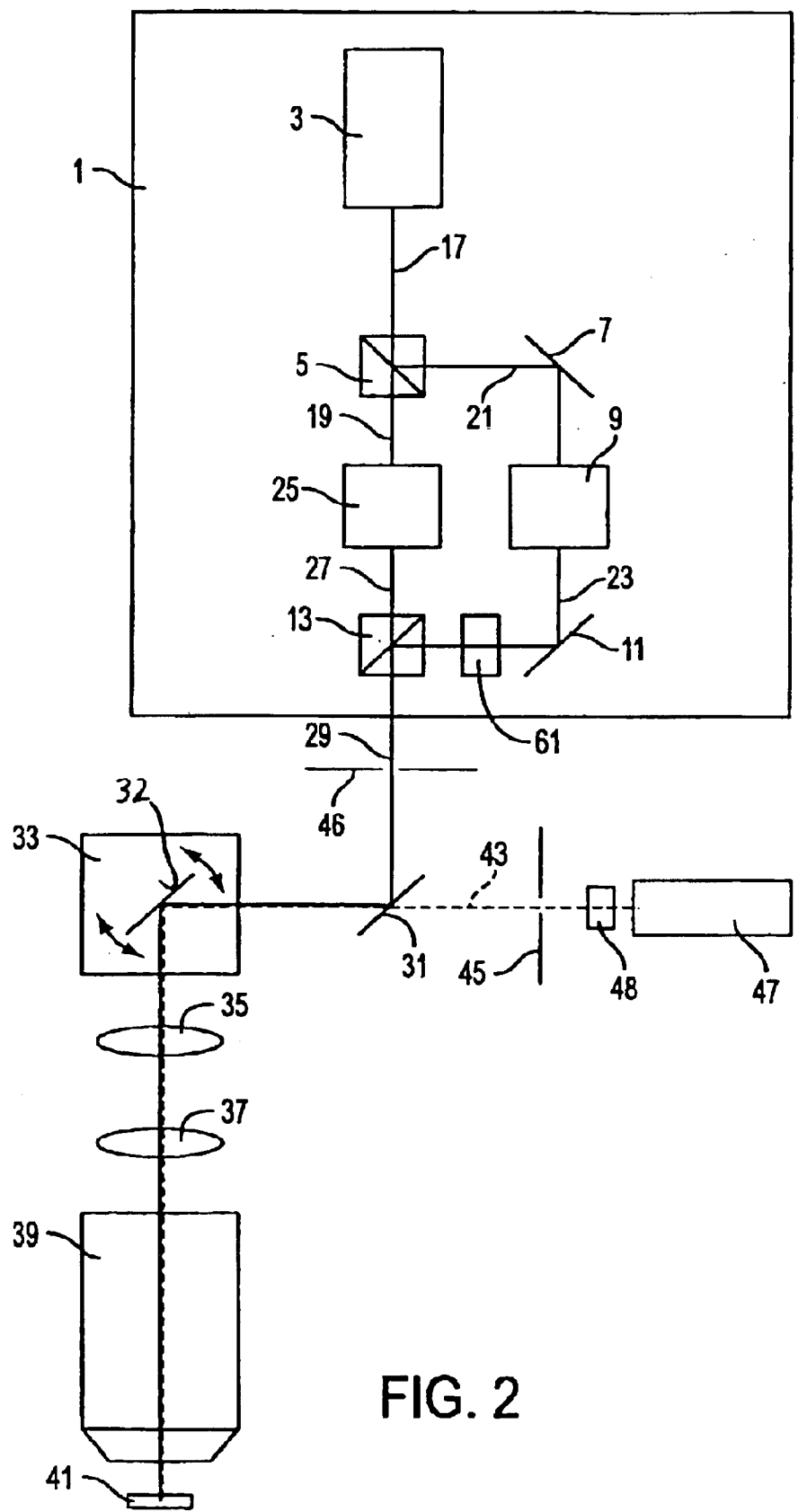
FIG. 2 shows a scanning microscope according to the present invention with elevated resolution using STED, in the descan configuration.

FIG. 2 shows a scanning microscope according to the present invention that is embodied as a confocal scanning microscope. In the embodiment shown here, light source 1 contains, in the beam path of partial light beam 23, not only an optical parametric oscillator 9 but also a means for influencing the focus shape, which is embodied as a $\lambda/2$ plate and through which only the central portion of the cross section of partial light beam 23 passes. Partial light beam 19 also arrives at an optical parametric oscillator 25. The partial light beam emerging therefrom has a different wavelength and is labeled 27. Partial light beam 23 that has passed through the $\lambda/2$ plate passes to dichroic beam combiner 13 and is combined there with partial light beam 27 to form illuminating light 29 that emerges from light source 1.

Illuminating light 29 is reflected from a beam combiner 31 to beam deflection device 33, which contains a gimbal-mounted scanning mirror 32 that guides illuminating light 29, through scanning optical system 35, optical system 37, and microscope optical system 39, over or through specimen 41. In the case of non-transparent specimens 41, illuminating light 29 is guided over the specimen surface. In the case of biological specimens 41 (preparations) or transparent specimens, illuminating light 29 can also be guided through specimen 41. This means that different focal planes of specimen 41 are scanned successively by illuminating light 29. Illuminating light 29 is depicted as a solid line. Detected light 43 emerging from the specimen arrives through microscope optical system 39 and via the beam deflection device 33 at the beam splitter 31, passes through the latter, and strikes detector 47, which is embodied as a photomultiplier. Detected light 43 emerging from specimen 41 is depicted as a dashed line. In detector 47, electrical detection signals proportional to the power level of detected light 43 emerging from the specimen are generated, and are forwarded to a processing unit (not depicted). Arranged in front of the detector is a bandpass filter 48 that blocks light of the wavelengths of partial light beams 23 and 27.

Illumination pinhole 46 and detection pinhole 45, which are usually provided in a confocal scanning microscope, are depicted schematically for the sake of completeness. Certain optical elements for guiding and shaping the light beams are omitted, however, for better clarity; these are sufficiently known to those skilled in this art.

Figure 3:
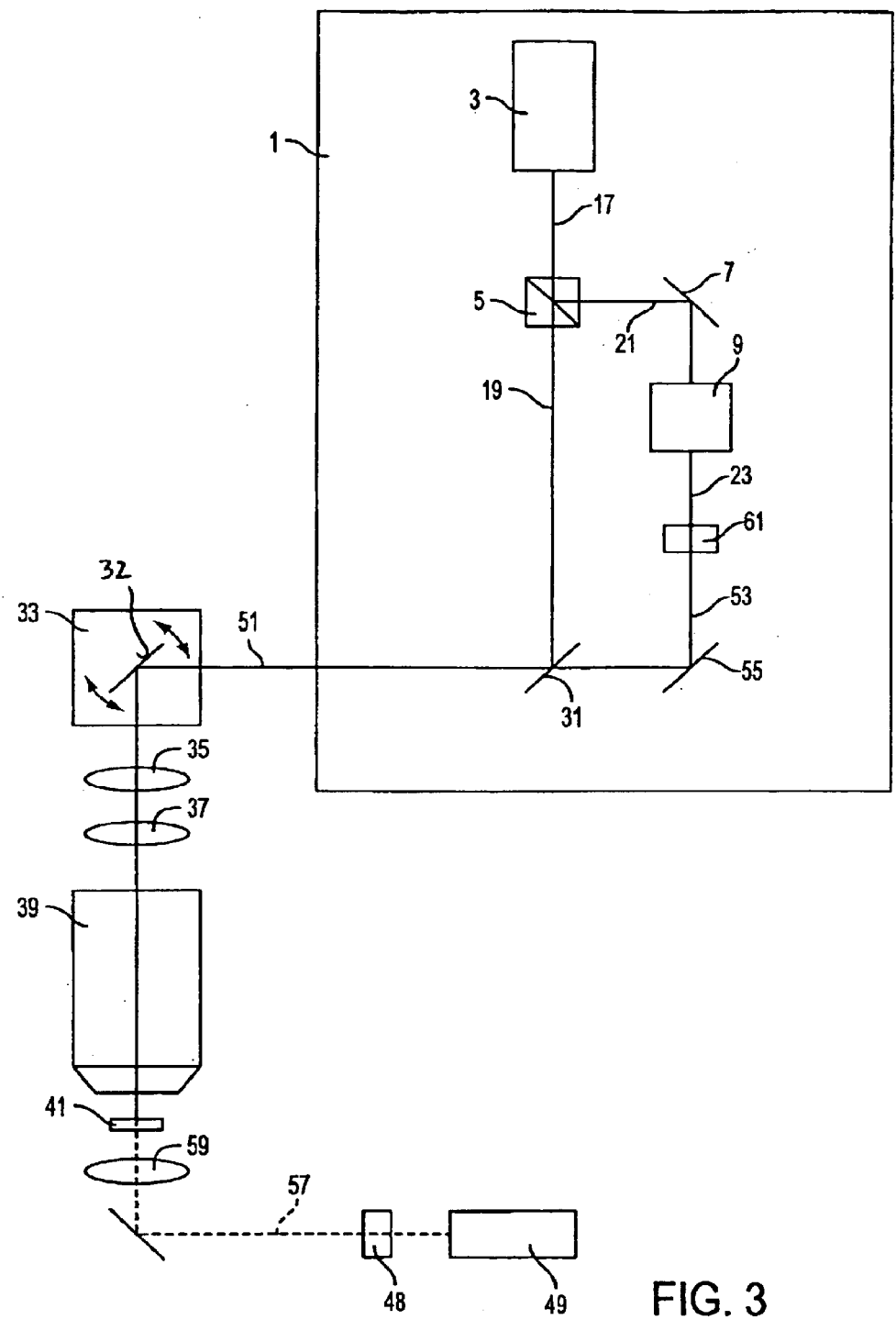
FIG. 3 shows a scanning microscope according to the present invention with elevated resolution using STED, in the non-descan configuration and with multi-photon excitation.

FIG. 3 shows a scanning microscope according to the present invention in non-descan configuration with multi-photon excitation. Illumination is provided substantially by light source 1 shown in FIG. 1, which additionally contains a means for influencing the focus shape which is embodied as $\lambda/2$ plate 61 and through which only the central portion of the cross section of partial light beam 53 passes. Partial light beam 53 that has passed through $\lambda/2$ plate 61 is reflected via mirror 55 to dichroic beam combiner 31, and combined there with partial light beam 19 to form illuminating light 51 that emerges from light source 1. Sample 41 is illuminated in a manner analogous to that described in FIG. 2. Excitation of a region of specimen 41 is effected with the component of illuminating light 51 that exhibits the wavelength of partial light beam 19. The stimulated emission is generated with the component of illuminating light beam 51 that has the wavelength of partial light beam 23. $\lambda/2$ plate 61 causes this component of illuminating light beam 51 to have an internally hollow focus, the result being clipping of the emission volume in all spatial directions and thus an increase in resolution in the axial and lateral directions.

In this embodiment, detection takes place on the condenser side. Detected light 57 emerging from specimen 41 is focused by condenser 59 and directed to detector 49, which is embodied as a photomultiplier. Arranged in front of the detector is a bandpass filter 48 that blocks light of the wavelength of partial light beam 23.

Figure 4A:
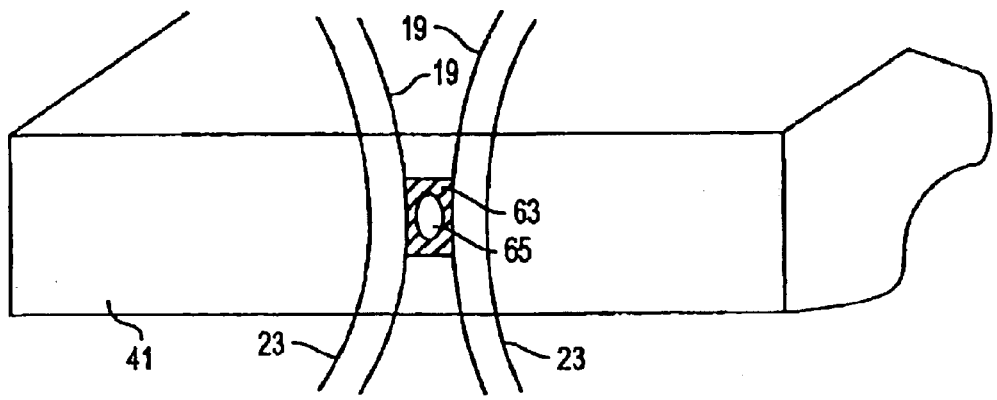
FIG. 4a schematically depicts the overlapping partial light beams of a specimen.

FIG. 4a illustrates the physical locations of first and second partial light beams 19 and 23 within or on the surface of specimen 41 being examined. Second partial light beam 23 possesses a larger beam diameter than first partial light beam 19, so that in the focus region, first partial light beam 19 is completely surrounded by second partial light beam 23. Second partial light beam 23 has an internally hollow focus. The overlap between first and second partial light beams 19 and 23 defines in the focus region a three-dimensional overlap region 63 that is depicted in FIG. 4a as a cross-hatched surface. The region that lies in the focus region of first partial light beam 19 and within the hollow portion of second partial light beam 23 defines emission volume 65.

Figure 4B:
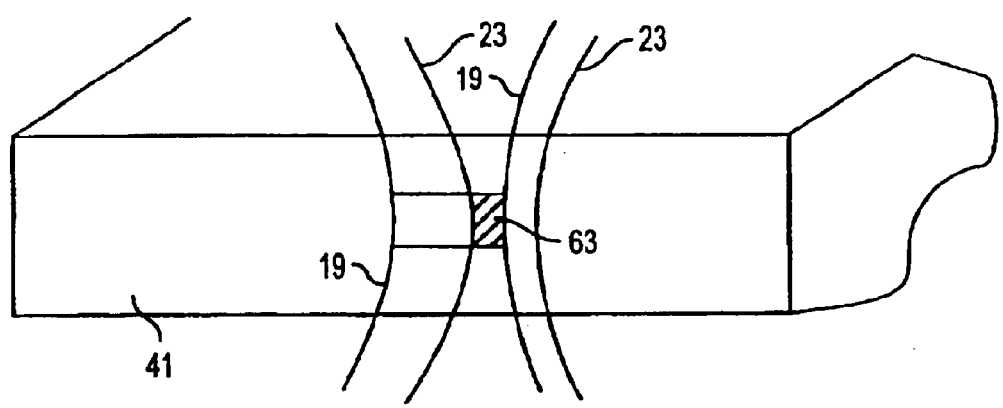
FIG. 4b also schematically depicts the overlapping partial light beams of a specimen.

FIG. 4b also illustrates the physical locations of first and second partial light beams 19 and 23 within or on the surface of specimen 41 being examined. Second partial light beam 23 and first partial light beam 19 intersect in their respective edge regions. The overlap in the edge regions of first and second light beams 19 and 23 defines in the focus region a three-dimensional overlap region 63 that is depicted in FIG. 4b as a crosshatched surface.

The invention was described with reference to a particular embodiment. It is nevertheless self-evident that changes and modifications can be made without thereby leaving the range of protection of the claims recited hereinafter.

What is claimed is:

1. A system comprising a scanning microscope and a light source connected to and configured for providing illumination in said scanning microscope, the light source comprising:
    an electromagnetic energy source that emits light of one wavelength;
    a means for spatially dividing the light into at least two partial light beams, which is placed after the electromagnetic energy source; and
    an intermediate element for wavelength modification in at least one of said at least two partial light beams.

2. The light source as defined in claim 1, wherein at least one of said at least two partial light beams is directed directly onto a specimen and there optically excites a first region of the specimen.

3. The light source as defined in claim 1, wherein the intermediate element is an optical parametric oscillator.

4. The light source as defined in claim 1, wherein the intermediate element is an element for frequency multiplication.

5. The light source as defined in claim 1, wherein an element for beam shaping is placed after the intermediate element.

6. The light source as defined in claim 1, wherein the electromagnetic energy source is a laser.

7. The light source as defined in claim 1, wherein the electromagnetic energy source is a pulsed laser.

8. A light source for illumination in scanning microscopy, comprising:
    an electromagnetic energy source that emits light of one wavelength;
    a means for spatially dividing the light into at least two partial light beams, which is placed after the electromagnetic energy source; and
    an intermediate element for wavelength modification in at least one of said at least two partial light beams,
        wherein at least one of said at least two partial light beams is directed directly onto a specimen and there optically excites a first region, and
        wherein at least one further partial light beam is directed via the intermediate element onto a second region of the specimen, whereby an overlap region of the first and the second region is constituted.

9. The light source as defined in claim 8, wherein stimulated emission is generated in the overlap region.

10. A light source for illumination in scanning microscopy, comprising:
    an electromagnetic energy source that emits light of one wavelength;
    a means for spatially dividing the light into at least two partial light beams, which is placed after the electromagnetic energy source; and
    an intermediate element for wavelength modification in at least one of said at least two partial light beams,
        wherein at least one of said at least two partial light beams is directed directly onto a specimen and there optically excites a first region, and
        wherein the excitation is multi-photon excitation.

11. A scanning microscope comprising:
    an electromagnetic energy source that emits light of one wavelength;
    a means for spatially dividing the light into at least two partial light beams, which is placed after the electromagnetic energy source;
    an intermediate element for wavelength modification in at least one of said at least two partial light beams;
    a beam deflection device for guiding the at least two partial light beams over a specimen; and
    a microscope optical system for focusing the at least two partial light beams.

12. The scanning microscope as defined in claim 11, wherein at least one of said at least two partial light beams is directed onto the specimen and there optically excites a first region of the specimen.

13. The scanning microscope as defined in claim 12, wherein at least one of said at least two partial light beams is directed via the intermediate element onto a second region of the specimen, whereby an overlap region of the first and the second region is constituted.

14. The scanning microscope as defined in claim 13, wherein stimulated emission is generated in the overlap region.

15. The scanning microscope as defined in claim 12, wherein the excitation is multi-photon excitation.

16. The scanning microscope as defined in claim 11, wherein the intermediate element is an optical parametric oscillator.

17. The scanning microscope as defined in claim 11, wherein the intermediate element is an element for frequency multiplication.

18. The scanning microscope as defined in claim 11, wherein an element for beam shaping is placed after the intermediate element.

19. The scanning microscope as defined in claim 11, wherein the electromagnetic energy source is a laser.

20. The scanning microscope as defined in defined in claim 11, wherein the electromagnetic energy source is a pulsed laser.

21. A system comprising a scanning microscope and a light source connected to and configured for providing illumination in said scanning microscope, the light source comprising:
- an electromagnetic energy source that emits light of one wavelength;
- at least one beam splitter configured to spatially divide the light into at least two partial light beams and placed after the electromagnetic energy source; and
- an intermediate element for wavelength modification in at least one of said at least two partial light beams.

22. A scanning microscope comprising:
- an electromagnetic energy source that emits light of one wavelength;
- at least one beam splitter configured to spatially divide the light into at least two partial light beams and placed after the electromagnetic energy source;
- an intermediate element for wavelength modification in at least one of said at least two partial light beams;
- a beam deflection device for guiding the at least two partial light beams over a specimen; and
- a microscope optical system for focusing the at least two partial light beams.

* * * * *